Jan. 28, 1958 H. O. SCHUETZE 2,821,612
LABEL ACTIVATOR
Filed Oct. 19, 1955 2 Sheets-Sheet 1
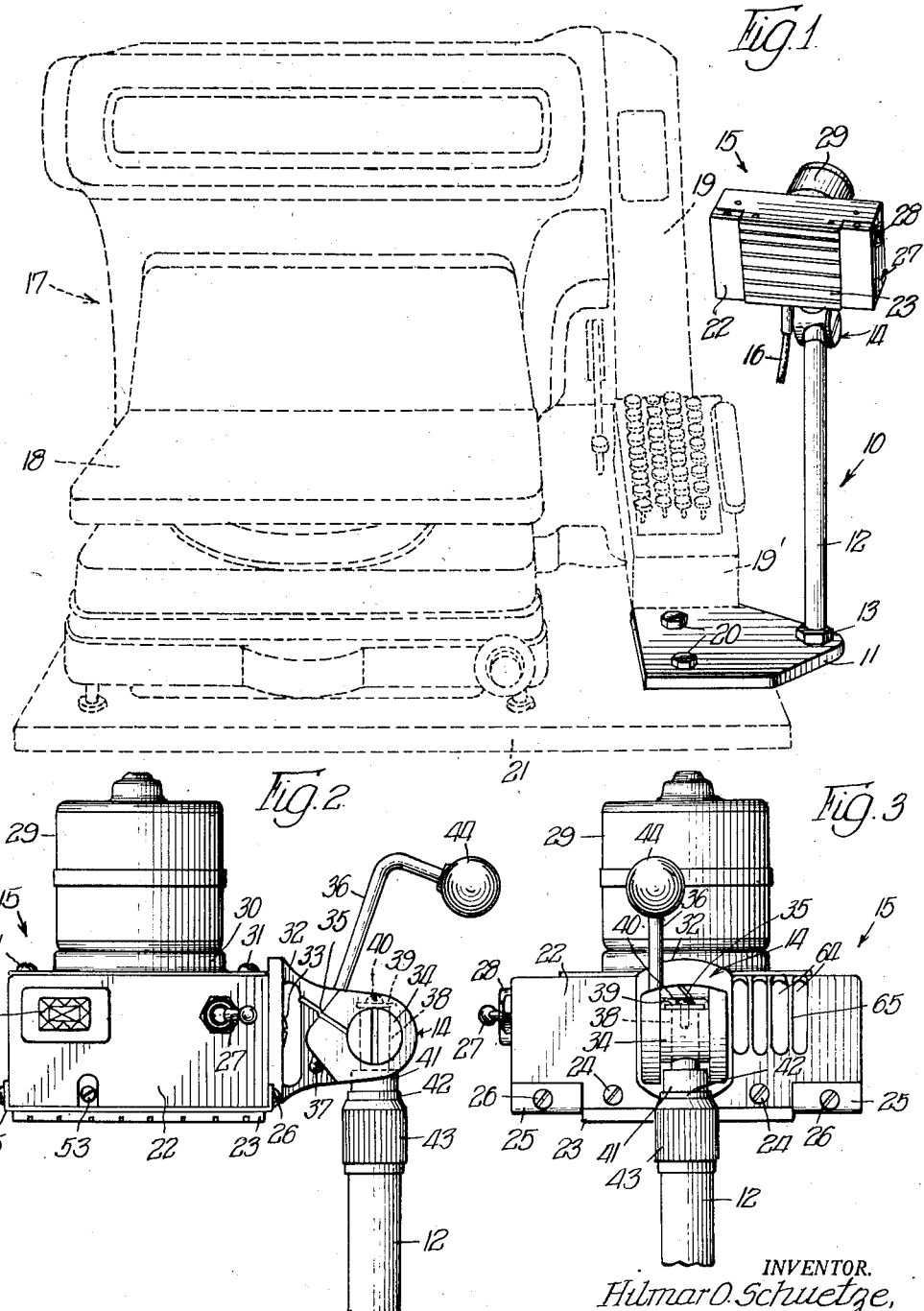
INVENTOR.
Hilmar O. Schuetze,
BY

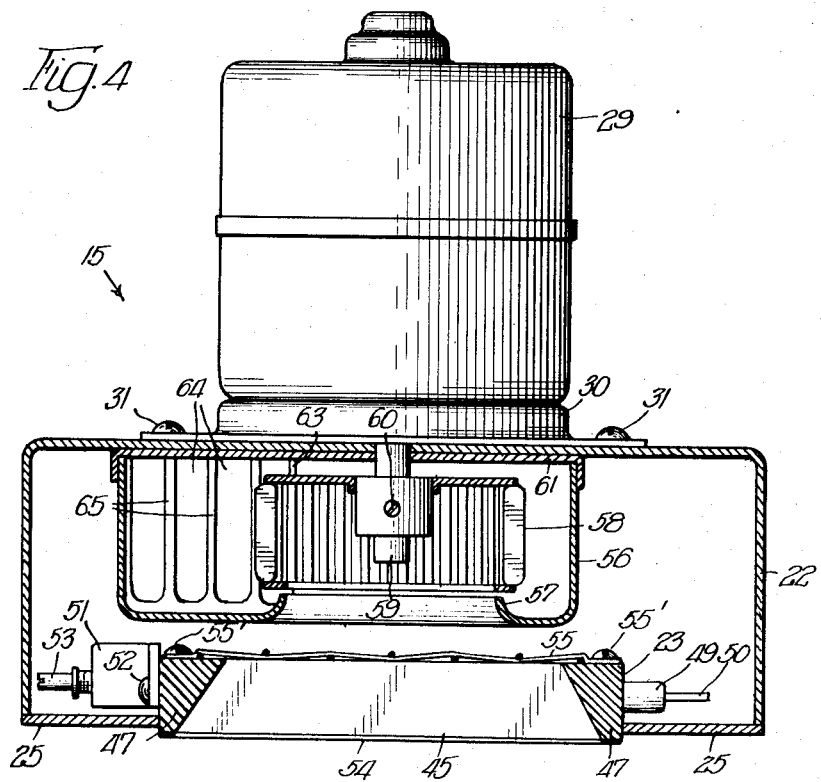
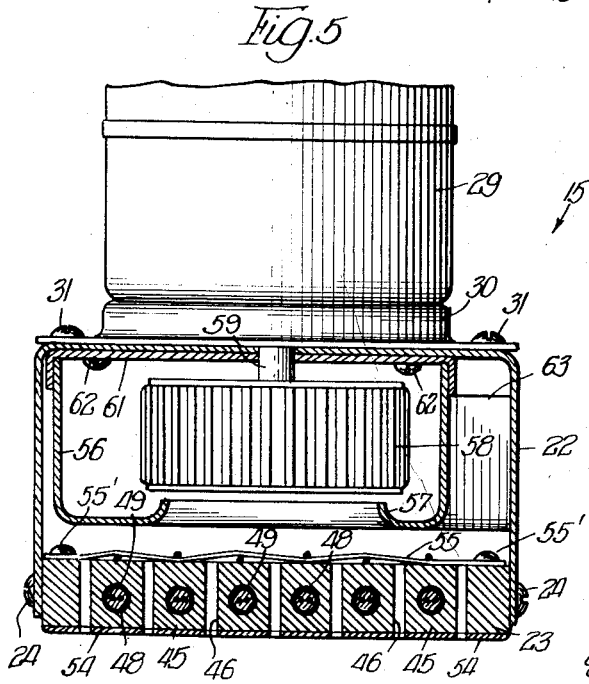

United States Patent Office 2,821,612
Patented Jan. 28, 1958

2,821,612

LABEL ACTIVATOR

Hilmar O. Schuetze, Chicago, Ill., assignor to Great Lakes Stamp & Mfg. Co., Inc., Chicago, Ill., a corporation of Illinois Application October 19, 1955, Serial No. 541,490

16 Claims. (Cl. 219—19)

The present invention is directed to an improved label activating device for use with labels having applied thereto a coating of a thermo-responsive adhesive. The device of the present invention is an improvement over that disclosed in my copending application, Serial No. 491,473, filed March 1, 1955, now Patent 2,775,677, of which the present application is a continuation-in-part.

It is an object of the present invention to provide an improved label activating device including adjustment means which allows the label activating unit included therein to be positionally adjusted thereby increasing the utility of the device to allow its use with different types of package handling apparatus.

Another object is to provide an improved label activating unit for use in the aforementioned device featuring a more compact design of reduced weight along with other improvements which will subsequently become clear which combine to provide a device readily adapted for use by itself or in combination with package handling apparatus.

Other objects not specifically set forth will become apparent from the following detailed description made in conjunction with the drawings wherein:

Fig. 1 is a perspective view of the device of the present invention illustrating a manner in which it may be used with one form of package handling apparatus which is shown in dotted lines therein;

Fig. 2 is a partial fragmentary side elevation of the device of Fig. 1;

Fig. 3 is a partial fragmentary rear elevation of the device of Fig. 1;

Fig. 4 is an enlarged partial vertical section of the device as shown in Fig. 2; and Fig. 5 is a partial vertical section of the device taken at right angles to the view of Fig. 4.

In Fig. 1 the improved activator device 10 is shown as including a base plate 11 having mounted thereon a vertical member 12 which is threadedly received by the base plate 11 and clamped thereto by a nut 13. The member 12 is attached to a universal joint generally designated 14 which, in turn, is connected to a label activating unit generally designated by the numeral 15. The activating unit 15 is provided with an electrical connection 16, only a portion of which is shown, for supplying electricity thereto to operate the same. The specific details of the device 10 will be subsequently described in connection with Figs. 2–5.

The device 10 is illustrated in Fig. 1 in what would be its operative position with a package handling apparatus which is shown in dotted lines. The package handling apparatus illustrated is an automatic weighing and label marking scale generally designated 17. This scale may be of a known type comprising generally a weighing platform 18, a label dispensing unit 19 including a price marking device 19'. The unit 17 may be provided with a supply of labels having thermo-responsive adhesive coatings applied on the back surfaces thereof. The label backings are of thin flexible paper and are adapted to be printed with the total price of a particular packaged product by the unit 17. The device 10 is adapted to be attached by its base plate 11 through means of bolts 20 with a supporting surface such as 21 on which the scale unit 17 may also be mounted. A finished packaged product may be placed on the scale platform 18, the total price of the product on a per pound basis determined and a thermo-activated label dispensed following the marking of the total price thereon. The dispensed label is then brought into contact with the unit 15 in a manner to be described, its adhesive coating activated and the package brought into contact with the label thereby completing the package for display and subsequent sale.

While the label activating device 10 has been described in connection with its use with a label dispensing scale unit 17 in Fig. 1, it should be understood that the device 10 may be used with many different forms of package handling apparatus. For this reason the scale unit 17 of Fig. 1 has not been shown in detail but has been illustrated in dotted lines merely to demonstrate one aspect of use of the activating device 10 of the present invention.

With reference to Figs. 2 and 3, the label activating unit 15 includes an outer housing which is substantially completely enclosed and which receives centrally thereof along one of its outer horizontal surfaces a heat conductive plate or grid 23 held in the housing by screws 24. The grid 23 extends the full width of the outer housing 22 and projects slightly outwardly of the surface thereof. U-shaped plates 25 abut each end of the heat conductive grid 23 to seal off the remaining portions of the grid supporting surface of the outer housing 22. The plates 25 overlap portions of the vertical sides of the housing 22 and are attached thereto by screws 26. The housing 22 supports an operating switch 27 and an indicating light 28 on one of its vertical end walls. The switch 27 controls the operation of the various units of the label activator unit 15 to be described and the light 28 indicates the operation of these elements. The top horizontal surface of the housing 22 supports an enclosed electric motor unit 29 which includes a flanged mounting member 30 attached to the housing 22 by screws 31.

The back vertical wall of the housing 22 has attached thereto a bracket supported clevis 32 by a screw 33. The clevis 32 forms a part of the universal unit 14 and receives in the bore thereof a split cylinder 34. One segment of the clevis 32 is split as shown at 35 and receives a position-fixing arm 36 therethrough. The portion of the arm 36 received by the split segment is threaded, as shown by the reference numeral 37, to allow the drawing together of the opposed surfaces of the slotted portion 35 thereby reducing the inner diameter of the bore of the clevis 32 to grip the split cylinder 34. Centrally of the split cylinder 34 and intermediate the clevis arms is a vertically extending rod 38 which extends through the hollow cylinder segments 34 and is held in position therewith by a washer 39 and screw 40. The rod 38 is rotatable with respect to the cylinder 34. The bottom portion of the rod 38 is enlarged at 41 and fixedly received within one end of a hollow rod 42. The rod 42 is in turn received within the member 12 and is adapted for relative longitudinal movement therewith thereby providing the member 12 with vertically extendable means. A clamping nut 43 is mounted on the upper end of the rod 12 and is adapted to restrict relative movement between the rod 42 and the rod 12 by suitable adjustment.

As a result of the aforementioned mounting arrangement the label activating unit 15 may be vertically adjusted by the loosening of the nut 43 followed by movement of the rod 42 with respect to the rod 12. Upon the attainment of a desired height of the unit 15 the nut 43 may be suitably tightened to fix the relative position between the rods 42 and 12. The rod 36 is provided with hand grasping means 44 thereby allowing it to be readily retracted or advanced with respect to the clevis 32 by reason of its threaded portion 37. Upon the retracting of the rod 36 the opposed surfaces of the slot 35 are allowed to separate from one another to an extent that the split cylinder 34 is no longer bound by the clevis 32 to restrict relative movement of the latter. As a result the label activating unit 15 may be rotated through a vertical arc about the axis of the split cylinder 34 and its position at any point along this arc may be fixed by the advancing of the rod 36 to an extent that the opposed surfaces of the slot 35 are brought into closer contact to restrict further rotation of the clevis 32 about the split cylinder 34. The split cylinder 34, upon the withdrawing of the rod 36 sufficiently to allow vertical rotation of the unit 15 about the cylinder 34, releases its frictional engagement with the rod 38 extending centrally therethrough. Consequently the activating unit 15 may be rotated about the longitudinal axis of the rod 38 to an extent that its rotation may describe thereby a complete circle. Upon the advancing of the rod 36 and the bringing together of the opposed surfaces of the slot 35 the two sections of the cylinder 34 are brought into frictional engagement with the rod 38 thereby restricting further horizontal rotational movement of the activating unit 15 thereabout.

As a result of the above described arrangement the label activating device 10 is provided with positioning means which allow the label activating unit 15 to be moved to various positions and fixed in these positions by the operation of the position fixing means including rod 36 and the clamping nut 43. Consequently the label activating device 10 is highly versatile and adapted for use with many different types of package handling apparatus. For example, with reference to Fig. 1, the weighing and label marking unit 17 indicated therein is normally provided with a side door through which access is gained to the label supply maintained within the unit. The universal movement of the label activating head 15 allows adjustment to a position where it will not interfere with the operation of the door following the use of which the head 15 may be replaced in its desired operative position. Furthermore, regardless of the environment in which the device 10 is used, the label activating head 15 may be positioned at varying angles thereby insuring the greatest ease of operation to fit varying requirements.

For a description of the elements included in the outer housing 22 reference is now made to Figs. 4 and 5. As previously described, the heating plate 23 is inserted within the housing 22 through one surface thereof, this being the bottom surface as shown in the drawings. Screws 24 extend through the outer housing 22 and fixedly position the grid 23 therein. The outer surface of the grid extends slightly outwardly of the face of the housing 22 and is adapted to receive labels coated with thermo-responsive adhesive thereon to activate the same. The grid 23 is subdivided into a plurality of laterally spaced bars 45 which define a plurality of laterally spaced slots 46 therebetween. The bars 45 are integrally connected to one another near their ends by the triangularly shaped sections 47 and, as a result, the grid 23 is a one-piece unit which may be readily inserted within the housing 22 or removed therefrom as desired. Each of the bars 45 are provided with an internal longitudinally extending conduit or passageway 48 which receives therein a heating element 49. Suitable electrical connections 50 are provided to the heating elements 49 while being in turn connected with the electrical conduit means 16 shown in Fig. 1.

A thermostatic control 51 is mounted on one side edge of the grid 23 by a screw 52 and in turn is suitably connected to the heating elements 49 to control the temperature of the grid 23. The thermostat 51 may be controlled by an adjusting screw 53 which is accessible through the housing 22 as shown in Fig. 2. The outer surface of the grid 23 is preferably provided with a nontacky coating 54 such as "Teflon" which is a polymer of tetrafluoroethylene. Such a coating may be applied by a suitable spraying operation and has been found to exhibit long wearing properties when present in a thickness of approximately 3 or 4 mils. The coating is capable of withstanding the temperatures utilized and alleviating sticking between the label and the grid surface. If desired, a sheet or jacket of material such as "Teflon" can be suitably placed on top of the grid 23 for the same purpose as the coating 54 thereby eliminating the coating operation.

The inner surface of the grid 23 provides a support for a restraining means 55 which is formed from a plurality of wires interwoven at right angles to one another. The screen 55 thus formed is held at its corners to the inner surface of the grid 23 by screws 55'. The restraining means 55 eliminates the possibility of a label brought into contact with the outer surface of the plate 23 to be drawn into the interior of the housing 22 through one of the slots 46. By eliminating this possibility the air inducing means to be described is not subjected to the danger of becoming inoperative due to the contact therewith of a label drawn through the grid 23.

Within the housing 22 immediately behind the grid 23 is a fan housing 56 having a flanged opening 57 therein immediately behind the grid 23. The opening 57 is aligned with a vacuum-type fan 58 of the squirrel-cage variety mounted on an output shaft 59 of the electric motor 29 by a screw 60. The output shaft 59 extends through the outer housing 22 and a cover plate 61 which is flange-rolled about the side edges of the fan housing 56 and the combined unit attached to the inner surface of the housing 22 by screws 62. The fan housing 56 includes an outlet conduit 63 which cooperates with vertically extending slots 64 defined by vertical grid members 65 in the outer housing 22. The fan housing outlet slots 64 are positioned immediately to one side of the clevis 32 in a vertical side wall of the housing 22 as shown in Fig. 3. In connection with this particular arrangement, it should be noted that the exhaust outlet of the fan housing 56 is arranged to direct the air exhaust away from the grid 23 at an angle of 90°.

In the operation of the label activating unit 15 the switch 27 is turned on which results in the energizing of the light 28, the heating elements 49 and the fan 58 through the motor 29. Air is drawn inwardly through the slots 46 in the grid 23, through the inlet 57 of the fan housing 56 and ultimately out of the housing 22 through the exhaust conduit 63 and the outlet slots 64. Upon the heating of the outer surfaces of the bars 45 to an appropriate temperature a label having a thermo-responsive adhesive coating applied thereto may be brought into contact with the "Teflon" coated surface 54 of the grid 23. The label is placed into contact therewith in a face down position thereby placing the adhesive coating outwardly of the grid surface and out of contact therewith. The air induced through the grid 23 flattens the label against the outer surface of the grid and, as a result, insures complete activation of the coating throughout its entire surface area. No curling due to the action of the heat on the adhesive coating results as the air induced by the fan 58 draws the label flat against the outer surface of the grid 23. The outer housing 22 being substantially enclosed by reason of the end plates 25 insures efficient operation of the fan 58 in drawing the air inwardly through the slots 46 of the grid 23.

As previously described, due to the universal mounting arrangement of the activating unit 15 the unit may be placed in any desired position depending upon the conditions under which it is operated. The arrangement and use of the fan 58 allows the activating unit 15 to be efficiently used in any position as the label is drawn into intimate contact with the outer surface of grid 23. As illustrated in Figs. 2 and 3, the label activating unit 15 may be operated in a position wherein its heated grid 23 faces in a downwardly direction. Still further, as illustrated in Fig. 1, the unit 15 may be operated at an angle of approximately 45° to the horizontal. Obviously any intermediate positions as well as positions directing the outer surface of the grid 23 in an upwardly direction may be used.

The arrangement of the grid 23 and its associated side plates 25 allows the grid to be removed and replaced in a convenient manner. The heating elements 49 may be readily inserted or removed from the passageways 48 in the bars 45 and, as a result, any repairs necessary may be inexpensively brought about. The label activating unit 10 is inexpensively fabricated due to the particular arrangement of elements described above. While the overall cost of the unit is low it nevertheless is capable of highly efficient operation and is highly adaptable for use with many different forms of package handling apparatus.

Obviously, many modifications and variations of the invention as hereinbefore set forth may be made without departing from the spirit and scope thereof, and therefore only such limitations should be imposed as are indicated in the appended claims.

I claim:

1. A device for use in activating thermo-responsive adhesive coatings on relatively thin flexible label backings, said device including a housing, a surface of said housing having mounted therein a grid formed from a plurality of spaced bars defining therebetween a series of laterally spaced slots, heating means in said housing and cooperating with said grid to heat the outer surface thereof sufficiently to activate thermo-responsive labels brought into contact therewith, air inducing means in said housing to draw air through the slots of said grid to thereby retain labels in contact with said grid during the activation thereof, said inducing means being so arranged with respect to said grid to retain labels in contact therewith notwithstanding the position of said grid, electric motor driving means for said inducing means carried by said housing, and positioning means associated with said housing to move and fix said grid in different positions, said positioning means including a fixable base for supporting the same and said housing as a single independent unit, and adjustable means intermediate said base and said housing to variably position said housing.

2. A device for use in activating thermo-responsive adhesive coatings on relatively thin flexible label backings, said device including a housing, a surface of said housing having mounted therein a one-piece grid subdivided into integrally connected spaced bars defining therebetween a series of laterally spaced slots, heating means in said housing and cooperating with said grid to heat the outer surface thereof sufficiently to activate thermo-responsive labels brought into contact therewith, air inducing means in said housing to draw air through the slots of said grid to thereby retain labels in contact with said grid during the activation thereof, said inducing means being so arranged with respect to said grid to retain labels in contact therewith notwithstanding the position of said grid, electric motor driving means for said inducing means carried by said housing, and positioning means associated with said housing to move and fix said grid in different positions, said positioning means including a fixable base for supporting the same and said housing as a single independent unit, and adjustable means intermediate said base and said housing to variably position said housing.

3. A device for use in activating thermo-responsive adhesive coatings on relatively thin flexible label backings, said device including a housing, a surface of said housing having mounted therein a one-piece grid subdivided into integrally connected spaced bars defining therebetween a series of laterally spaced slots, heating means in said housing and cooperating with said grid to heat the outer surface thereof sufficiently to activate thermo-responsive labels brought into contact therewith, air inducing means in said housing to draw air through the slots of said grid to thereby retain labels in contact with said grid during the activation thereof, said inducing means being so arranged with respect to said grid to efficiently retain labels in contact therewith notwithstanding the position of said grid, air exhaust means in said housing and arranged with said inducing means to allow air drawn into said housing thereby to readily escape therefrom, electric motor driving means for said inducing means positioned outwardly of and carried by said housing, and positioning means associated with said housing to move and fix said grid in different positions, said positioning means including a fixable base for supporting the same and said housing as a single independent unit, and adjustable means intermediate said base and said housing to variably position said housing.

4. A device for use in activating thermo-responsive adhesive coatings on relatively thin flexible label backings, said device including a housing, a surface of said housing having mounted therein a one-piece plate subdivided into integrally connected spaced bars defining therebetween a series of laterally spaced slots, heating elements in said housing and cooperating with said plate to heat the outer surface thereof sufficiently to activate thermo-responsive labels brought into contact therewith, air inducing means in said housing to draw air through the slots of said plate to thereby retain labels in contact with said plate during the activation thereof, said inducing means being so arranged with respect to said plate to efficiently retain labels in contact therewith notwithstanding the position of said plate, driving means for said inducing means positioned outwardly of said housing, label restraining means in said housing intermediate said plate and said inducing means, and positioning means associated with said housing to move and fix said plate in different positions.

5. A label activator for use in activating thermo-responsive adhesive coatings on relatively thin flexible label backings, said activator including an enclosed housing, a surface of said housing having mounted therein a one-piece plate subdivided into integrally connected spaced bars defining therebetween a series of laterally spaced slots, said plate presenting a single plane surface outwardly of the surface of said housing, heating elements within each of said bars to heat the outer surfaces thereof sufficiently to activate thermo-responsive labels brought into contact therewith, air inducing means in said housing to draw air through the slots of said plate to thereby retain labels in contact with said plate during the activation thereof, said inducing means being so arranged with respect to said plate to efficiently retain labels in contact therewith notwithstanding the position of said plate, air exhaust means in a side wall of said housing arranged with said inducing means to allow air drawn into said housing thereby to readily escape therefrom, driving means for said inducing means positioned outwardly of said housing, and positioning means associated with said housing to move and fix said plate in different positions.

6. A label activator for use in activating thermo-responsive adhesive coatings on relatively thin flexible label backings, said activator including an enclosed housing, a surface of said housing having mounted therein a one-piece plate subdivided into integrally connected spaced bars defining therebetween a series of laterally spaced slots, said plate presenting a single plane surface outwardly of the surface of said housing, heating elements within each of said bars to heat the outer surfaces thereof sufficiently to activate thermo-responsive labels brought into contact therewith, air inducing means in said housing to draw air through the slots of said plate to thereby retain labels in contact with said plate during the activation thereof, said inducing means being so arranged with respect to said plate to efficiently retain labels in contact therewith notwithstanding the position of said plate, air exhaust means in a side wall of said housing arranged with said inducing means to allow air drawn into said housing thereby to readily escape therefrom, driving means for said inducing means positioned outwardly of said housing, label restraining means in said housing intermediate said plate and said inducing means, and positioning means associated with said housing to move and fix said plate in different positions.

7. A label activator for use in activating thermo-responsive adhesive coatings on relatively thin flexible label backings, said activator including an enclosed housing, a surface of said housing having mounted therein a one-piece plate subdivided into integrally connected spaced bars defining therebetween a series of laterally spaced slots, said plate presenting a single plane surface outwardly of the surface of said housing, heating elements in said housing and cooperating with said plate to heat the outer surface thereof sufficiently to activate thermo-responsive labels brought into contact therewith, air inducing means in said housing to draw air through the slots of said plate to thereby retain labels in contact with said plate during the activation thereof, said inducing means being so arranged with respect to said plate to efficiently retain labels in contact therewith notwithstanding the position of said plate, air exhaust means in a side wall of said housing and arranged with said inducing means to allow air drawn into said housing thereby to readily escape therefrom, and housing positioning means attached to a vertical side of said housing, said positioning means including a vertically extendible member, universal means interconnecting said member and said housing, and position fixing means associated with said universal means to fixedly locate said housing including said plate in a desired position.

8. A label activator for use in activating thermo-responsive adhesive coatings on relatively thin flexible label backings, said activator including an enclosed housing, a surface of said housing having mounted therein a one-piece plate subdivided into integrally connected spaced bars defining therebetween a series of laterally spaced slots, said plate presenting a single plane surface outwardly of the surface of said housing, heating elements in said housing and cooperating with said plate to heat the outer surface thereof sufficiently to activate thermo-responsive labels brought into contact therewith, air inducing means in said housing to draw air through the slots of said plate to thereby retain labels in contact with said plate during the activation thereof, said inducing means being so arranged with respect to said plate to efficiently retain labels in contact therewith notwithstanding the position of said plate, air exhaust means in a side wall of said housing and arranged with said inducing means to allow air drawn into said housing thereby to readily escape therefrom, driving means for said inducing means positioned outwardly of said housing, and housing positioning means attached to a vertical side of said housing, said positioning means including a vertically extendible member, universal means interconnecting said member and said housing, said universal means adapted to allow said housing to move vertically to describe an arc about a pivot point therein and further allow movement of said housing about the longitudinal axis of said member, and position fixing means associated with said universal means to fixedly locate said housing including said plate in a desired position.

9. A label activator for use in activating thermo-responsive adhesive coatings on relatively thin flexible label backings, said activator including an enclosed outer housing, a surface of said outer housing having mounted therein a one-piece plate subdivided into integrally connected spaced bars defining therebetween a series of laterally spaced slots, said plate presenting a single plane surface outwardly of the surface of said outer housing, heating elements within each of said bars to heat the outer surfaces thereof sufficiently to activate thermo-responsive labels brought into contact therewith, a fan housing in said outer housing having an inlet aligned with the inner surface of said plate and having an outlet aligned with an exhaust outlet in said outer housing, a fan in said fan housing adapted to draw air thereinto through the slots of said plate to thereby retain labels in contact with said plate during the activation thereof notwithstanding the position of said plate, said exhaust outlet adapted to deliver air from said fan housing outwardly of said outer housing in a direction away from said plate of approximately 90° with respect thereto, driving means for said fan mounted on said outer housing outwardly thereof, label restraining means in said outer housing intermediate said plate and said inducing means, and positioning means associated with said outer housing to move and fix said plate in different positions.

10. A label activator for use in activating thermo-responsive adhesive coatings on relatively thin flexible label backings, said activator including an enclosed housing, a surface of said housing having mounted therein a one-piece plate subdivided into integrally connected spaced bars defining therebetween a series of laterally spaced slots, said plate presenting a single plane surface outwardly of the surface of said housing, heating elements within each of said bars to heat the outer surfaces thereof sufficiently to activate thermo-responsive labels brought into contact therewith, air inducing means in said housing to draw air through the slots of said plate to thereby retain labels in contact with said plate during the activation thereof, said inducing means being so arranged with respect to said plate to efficiently retain the labels in contact therewith notwithstanding the position of said plate, air exhaust means in a side wall of said housing and arranged with said inducing means to allow air drawn into said housing thereby to readily escape therefrom, driving means for said inducing means positioned outwardly of said housing, label restraining means in said housing intermediate said plate and said inducing means, and housing positioning means attached to a vertical side of said housing, said positioning means including a vertically extendible member, universal means interconnecting said member and said housing, said universal means adapted to allow said housing to move vertically to describe an arc about a pivot point therein and further allow movement of said housing about the longitudinal axis of said member, and position fixing means associated with said universal means to fixedly locate said housing including said plate in a desired position.

11. A label activator for use in activating thermo-responsive adhesive coatings on relatively thin flexible label backings, said activator including an outer enclosed housing, a surface of said outer housing having mounted therein a one-piece plate subdivided into integrally connected spaced bars defining therebetween a series of laterally spaced slots, said plate presenting a single plane surface outwardly of the surface of said outer housing, heating elements within each of said bars to heat the outer surfaces thereof sufficiently to activate thermo-responsive labels brought into contact therewith, a fan housing in said outer housing having an inlet aligned with the inner surface of said plate and having an outlet aligned with an exhaust outlet in said outer housing, a fan in said fan housing adapted to draw air thereinto through the slots of said plate to thereby retain labels in contact with said plate during the activation thereof notwithstanding the position of said plate, said exhaust outlet adapted to deliver air from said fan housing outwardly of said outer housing in a direction away from said plate of approximately 90° with respect thereto, driving means for said fan mounted on said outer housing outwardly thereof, label restraining means in said outer housing intermediate said plate and said inducing means, and outer housing positioning means attached to a vertical side of said outer housing, said positioning means including a vertically extendible member, universal means interconnecting said member and said outer housing, said universal means adapted to allow said outer housing to move vertically to describe an arc about a pivot point therein and further allow movement of said outer housing about the longitudinal axis of said member, and position fixing means associated with said universal means to fixedly locate said outer housing including said plate in a desired position.

12. A compact, lightweight label activating unit adapted for use in varying positions and further adapted for mounting on package handling apparatus, said unit including an enclosed outer housing, a surface of said outer housing having mounted therein a one-piece plate subdivided into integrally connected spaced bars defining therebetween a series of laterally spaced slots, said plate presenting a single plane surface outwardly of the surface of said outer housing, heating elements within each of said bars to heat the outer surfaces thereof sufficiently to activate thermo-responsive labels brought into contact therewith, a fan housing in said outer housing having an inlet aligned with the inner surface of said plate and having an outlet aligned with an exhaust outlet in said outer housing, a fan in said fan housing adapted to draw air thereinto through the slots of said plate to thereby retain labels in contact with said plate during the activation thereof notwithstanding the position of said plate, driving means for said fan mounted on said outer housing outwardly thereof, and label restraining means in said outer housing intermediate said plate and said inducing means.

13. A label activating unit for use in activating thermo-responsive adhesive coatings on relatively thin flexible label backings, said unit including an enclosed outer housing, a surface of said outer housing having detachably mounted therein a one-piece plate subdivided into integrally connected spaced bars defining therebetween a series of laterally spaced slots, said plate presenting a single plane surface outwardly of the surface of said outer housing, heating elements within said outer housing and mounted internally of each of said bars to heat the outer surfaces thereof sufficiently to activate thermo-responsive labels brought into contact therewith, a fan housing in said outer housing having an inlet aligned with the inner surface of said plate in close proximity thereto and having an outlet aligned with an exhaust outlet in said outer housing, a fan in said fan housing adapted to draw air thereinto through the slots of said plate to thereby retain labels in contact with said plate during the activation thereof notwithstanding the position of said plate, driving means for said fan mounted on said outer housing outwardly thereof, and label restraining means attached to the inner surface of said plate in said outer housing and positioned in front of the inlet of said fan housing.

14. A label activating unit for use in activating thermo-responsive adhesive coatings on relatively thin flexible label backings, said unit including an enclosed outer housing, a surface of said outer housing having detachably mounted therein a one-piece plate subdivided into integrally connected spaced bars defining therebetween a series of laterally spaced slots, said plate presenting a single plane surface outwardly of the surface of said outer housing, heating elements mounted internally within each of said bars and extending the full longitudinal length thereof to heat the outer surfaces thereof sufficiently to activate thermo-responsive labels brought into contact therewith, a fan housing in said outer housing having an inlet aligned with the inner surface of said plate in close association therewith and having an outlet aligned with an exhaust outlet in said outer housing, a fan in said fan housing adapted to draw air thereinto through the slots of said plate to thereby retain labels in contact with said plate during the activation thereof notwithstanding the position of said plate, said exhaust outlet being arranged in said outer housing to deliver air from said fan housing outwardly of said outer housing in a direction away from said plate, driving means for said fan mounted on said outer housing outwardly thereof, and label restraining means attached to the inner surface of said plate in said outer housing and aligned with inlet of said fan housing.

15. A device for use in activating thermo-responsive adhesive coatings on relatively thin flexible label backings, said device including a housing, a surface portion of said housing being defined by a detachable apertured label receiving and activating plate-like member, heating means in said housing and in direct contact with said plate-like member, said heating means cooperating with said plate-like member to heat the outer surface thereof sufficiently to activate thermo-responsive labels brought into contact therewith, fan means wholly contained within said housing and associated with said plate-like member to draw air through the same to retain labels in contact therewith during the activation thereof, electric motor driving means carried by said housing and operatively connected to said fan means, and positioning means associated with said housing to move and fix the same including said plate-like member in different operative positions, said positioning means including a fixable base for supporting the same and said housing as a single independent unit, and adjustable means intermediate said base and said housing to variably position said housing.

16. A device for use in activating thermo-responsive adhesive coatings on relatively thin flexible label backings, said device including a housing, a surface portion of said housing being defined by a detachable apertured label receiving and activating plate-like member, heating means in said housing and in direct contact with said plate-like member, said heating means cooperating with said plate-like member to heat the outer surface thereof sufficiently to activate thermo-responsive labels brought into contact therewith, fan means wholly contained within said housing and associated with said plate-like member to draw air through the same to retain labels in contact therewith during the activation thereof, electric motor driving means carried by said housing and operatively connected to said fan means, and positioning means attached to said housing to move and fix the same including said plate-like member in different operative positions, said positioning means including a vertically extendible member, universal means interconnecting said member and said housing, said universal means adapted to allow said housing to move vertically to describe an arc about a pivot point therein and further allow movement of said housing about the longitudinal axis of said vertically extendible member, and position fixing means associated with said universal means to fixedly locate said housing including said plate-like member in a desired position.

References Cited in the file of this patent

UNITED STATES PATENTS

| | | |
|---|---|---|
| 1,752,797 | Hutchinson | Apr. 1, 1930 |
| 1,997,268 | Scharpf | Apr. 9, 1935 |
| 2,192,264 | Kallander | Mar. 5, 1940 |
| 2,247,623 | Von Hofe | July 1, 1941 |
| 2,689,372 | Goulding | Sept. 21, 1954 |
| 2,753,430 | Winberg | July 3, 1956 |
| 2,775,677 | Schuetze | Dec. 25, 1956 |